(12) United States Patent
Sugimoto et al.

(10) Patent No.: US 8,400,029 B2
(45) Date of Patent: Mar. 19, 2013

(54) ROTATING ELECTRICAL MACHINE HAVING A PLURALITY OF COOLING MEDIUM PATHS

(75) Inventors: Shinji Sugimoto, Hitachi (JP); Akiyoshi Komura, Hitachi (JP); Koji Obata, Hitachi (JP); Takashi Ishigami, Hitachinaka (JP); Satoshi Kikuchi, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 146 days.

(21) Appl. No.: 12/958,048

(22) Filed: Dec. 1, 2010

(65) Prior Publication Data

US 2011/0133580 A1 Jun. 9, 2011

(30) Foreign Application Priority Data

Dec. 4, 2009 (JP) ................................. 2009-276571

(51) Int. Cl.
*H02K 9/20* (2006.01)
*H02K 9/00* (2006.01)
*H02K 9/08* (2006.01)

(52) U.S. Cl. ................. 310/54; 310/52; 310/57; 310/58

(58) Field of Classification Search ................... 310/52, 310/54, 55, 57–59, 60 R
See application file for complete search history.

(56) References Cited

U.S. PATENT DOCUMENTS

| | | | | |
|---|---|---|---|---|
| 2,285,960 A | * | 6/1942 | Fechheimer | 310/54 |
| 3,502,920 A | * | 3/1970 | Chaboseau | 310/90 |
| 3,663,848 A | * | 5/1972 | Lehoczky | 310/90 |
| 2004/0195926 A1 | * | 10/2004 | Hiwaki et al. | 310/216 |

FOREIGN PATENT DOCUMENTS

| | | | |
|---|---|---|---|
| JP | 2004297924 A | * | 10/2004 |
| JP | 2005-168265 A | | 6/2005 |

OTHER PUBLICATIONS

Machine Translation JP2004297924 (2004).*

* cited by examiner

*Primary Examiner* — Tran N. Nguyen
*Assistant Examiner* — Jose Gonzalez Quinones
(74) *Attorney, Agent, or Firm* — Crowell & Moring LLP

(57) ABSTRACT

A rotating electrical machine includes: a stator that includes a cylindrical stator core and a stator winding wire wound around the stator core; and a rotor disposed facing the stator via a gap; wherein at least one cooling medium path extending in a direction of a central axis of the stator core is provided in the stator; and the cooling medium path is inclined relative to the central axis of the stator core.

10 Claims, 20 Drawing Sheets

FRONT-SIDE END FACE

REAR-SIDE END FACE

FRONT-SIDE END FACE

REAR-SIDE END FACE

SECTIONAL VIEW TAKEN ALONG D-D

FRONT-SIDE END FACE

REAR-SIDE END FACE

SECTION VIEW TAKEN ALONG E-E

FRONT-SIDE END FACE

ROTATING ELECTRICAL MACHINE HAVING A PLURALITY OF COOLING MEDIUM PATHS

INCORPORATION BY REFERENCE

The disclosure of the following priority application is herein Incorporated by reference: Japanese Patent Application No. 2009-276571 filed Dec. 4, 2009.

BACKGROUND OF THE INVENTION

1. Field of the Invention

The present invention relates to a rotating electrical machine with a stator cooled with a cooling medium.

2. Description of Related Art

The standard procedures through which a stator of a rotating electrical machine that drives an electric vehicle is cooled include an oil cooling method whereby an ATF (automatic transmission fluid) in the transmission is directly sprayed onto winding portions (coil end portions) exposed at ends located along the rotational axis of the rotating electrical machine.

As an alternative to the method whereby the cooling medium is directly sprayed onto the winding, there is a method known in the related art whereby the stator is cooled with a cooling medium delivered into a slot (see, for instance, Japanese Laid Open Patent Publication No. 2005-168265). Such a cooling system adopts a structure that includes a pipe in each slot housing the stator winding, in which the cooling medium flows in the pipe, and the cooling medium is allowed to flow out through holes formed on the surface of the pipe.

SUMMARY OF THE INVENTION

In an electric vehicle, the rotating electrical machine is normally used in a substantially horizontally placed state and thus, the slot of the stator is also held in a roughly horizontal state. This means that the system disclosed in the above mentioned Japanese Laid Open Patent may not always assure a smooth flow of the cooling medium through the slot once the cooling medium is delivered into the slot.

According to the 1st aspect of the present invention, a rotating electrical machine comprises: a stator that includes a cylindrical stator core and a stator winding wire wound around the stator core; and a rotor disposed facing the stator via a gap, wherein: at least one cooling medium path extending in a direction of a central axis of the stator core is provided in the stator; and the cooling medium path is inclined relative to the central axis of the stator core.

According to the 2nd aspect of the present invention, in a rotating electrical machine according to the 1st aspect, it is preferred that the cooling medium path is a groove formed on a wall surface of a slot in the stator core, extending from one end face of the stator core to another end face of the stator core.

According to the 3rd aspect of the present invention, in a rotating electrical machine according to the 1st aspect, it is preferred that the cooling medium path is a through hole formed in the stator core, going through the stator core from one end face of the stator core to another end face of the stator core.

According to the 4th aspect of the present invention, in a rotating electrical machine according to the 1st aspect, it is preferred that the cooling medium path is a groove formed on an outer circumferential surface of the stator core, extending from one end face of the stator core to another end face of the stator core.

According to the 5th aspect of the present invention, in a rotating electrical machine according to the 1st aspect, it is preferred that the cooling medium path is a through hole formed in an insulating material filling a slot that houses the stator winding, going through the stator core from one end face of the stator core to another end face of the stator core.

According to the 6th aspect of the present invention, in a rotating electrical machine according to the 2nd aspect, it is preferred that the slot and a tooth formed in the stator core both assume a skewed structure whereby the slot and the tooth are twisted from the one end face of the stator core toward the other end face of the stator core so as to rotate around the central axis of the stator core.

According to the 7th aspect of the present invention, in a rotating electrical machine according to the 1st aspect, it is preferred that a slot and a tooth formed in the stator core both assume a skewed structure whereby the slot and the tooth are twisted from the one end face of the stator core toward the other end face of the stator core so as to rotate around the central axis of the stator core; and the cooling medium path is a groove formed on a circumferential surface of the stator winding wire housed in the slot so as to extend along a direction in which the winding wire extends.

According to the 8th aspect of the present invention, in a rotating electrical machine according to the 7th aspect, it is preferred that the stator winding wire is a rectangular wire with a rectangular cross-section.

According to the 9th aspect of the present invention, in a rotating electrical machine according to the 1st aspect, it is preferred that the stator core is made up with a plurality of split core parts disposed along the central axis of the stator core; and an inflow port to which the cooling medium flows in is formed on an end face of a split core part facing a next split core.

According to the present invention, even when the rotating electrical machine is installed horizontally, the cooling medium can be distributed by taking advantage of the difference in height created by an inclination of the cooling medium paths and thus, the cooling efficiency can be improved.

DESCRIPTION OF PREFERRED EMBODIMENTS

Figure 1:
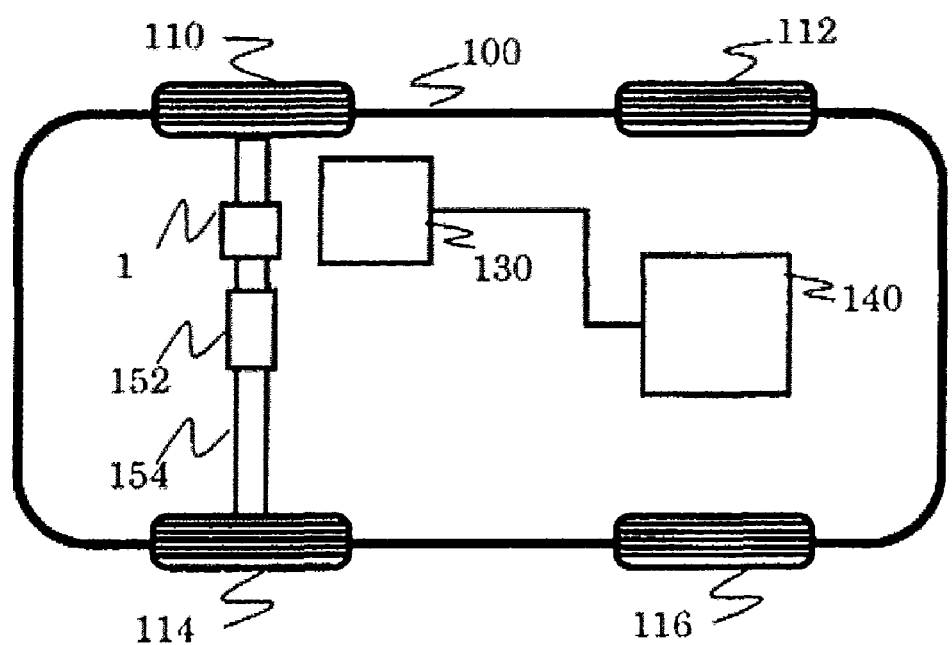
FIG. 1 is a block diagram of an electric vehicle with the rotating electrical machine according to the present invention installed therein.

The following is a description of embodiments of the present invention, given in reference to the drawings. FIG. 1 is a block diagram of an electric vehicle in which the rotating electrical machine according to the present invention is installed. A vehicle 100 is supported with four wheels 110, 112, 114 and 116. The electric vehicle is a front-wheel drive type vehicle, equipped with a rotating electrical machine 1 directly mounted to a front axle 154. The rotating electrical machine 1 is thus mounted transversely. The rotating electrical machine 1, which rotationally drives the wheels 110 and 114, is driven with electrical power provided from a battery 140 via a control device 130. The drive torque of the rotating electrical machine 1 is controlled by the control device 130.

It is to be noted that while the following description is given by assuming that the rotating electrical machine is utilized as a drive source for an electric vehicle, the present invention is not limited to electric vehicle applications, and it may also be utilized as an electric motor to drive an electric locomotive or the like.

Figure 2:
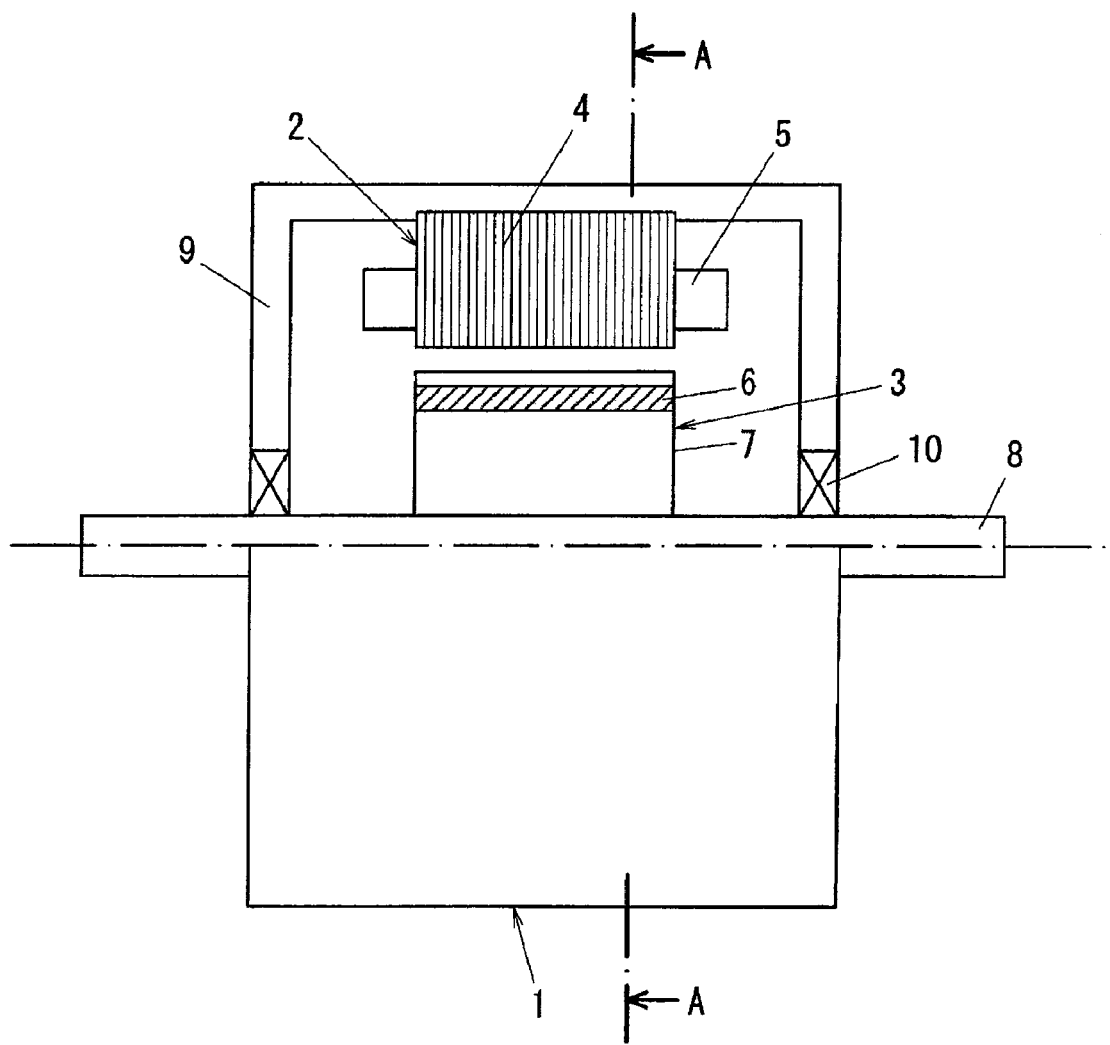
FIG. 2 is a partial sectional view of the rotating electrical machine 1, taken from the front side of the vehicle.
Figure 3:
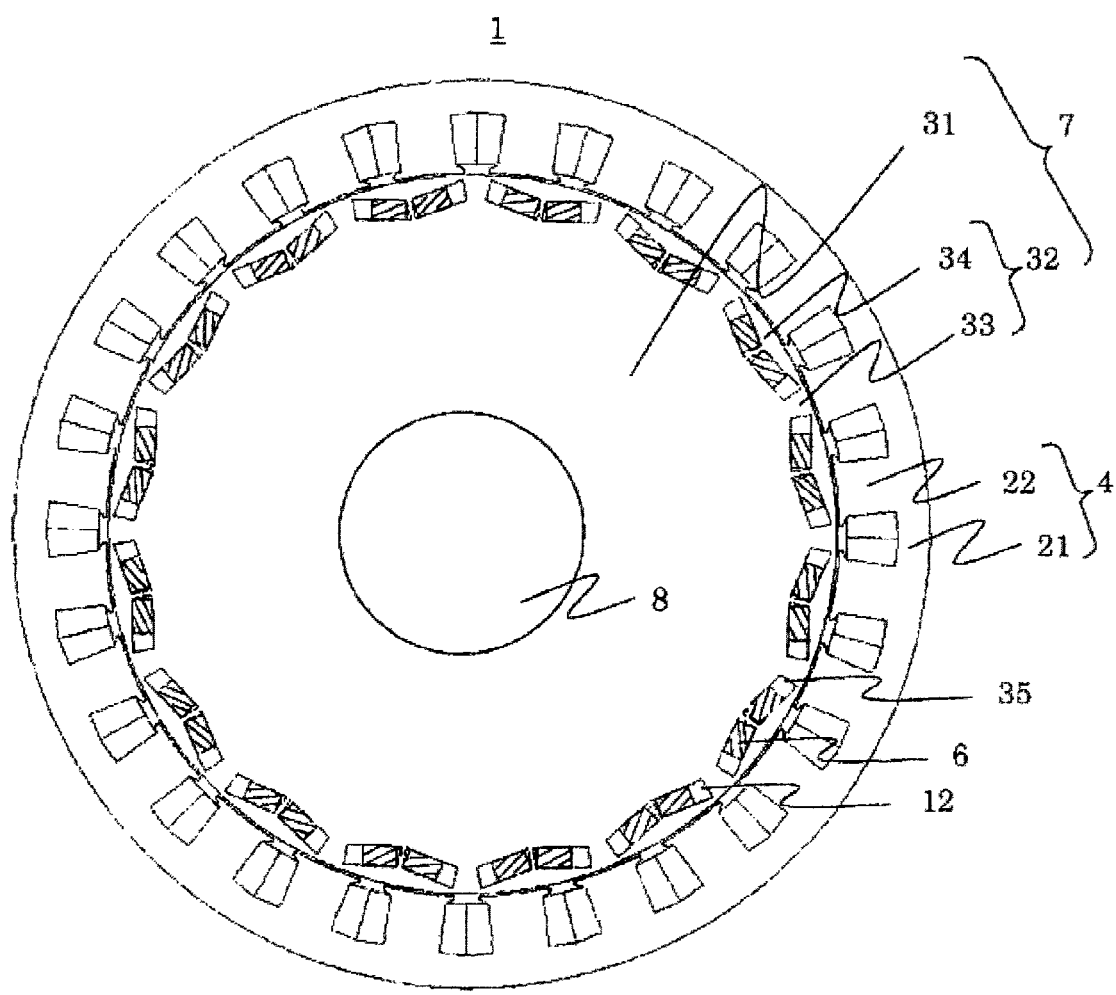
FIG. 3 is a sectional view taken along A-A in FIG. 2.

In reference to FIGS. 2 and 3, the overall structure of the rotating electrical machine is described. FIG. 2 is a partial sectional view of the rotating electrical machine in FIG. 1, taken from the front side of the vehicle. FIG. 3 is a sectional view taken along A-A in FIG. 2. It is to be noted that in FIG. 3 a housing 9 is omitted. A stator 2 of the rotating electrical machine 1 includes a stator core 4, multi-phase stator windings 5 wound around the stator core 4, and the housing 9 which holds the stator core 4 in its inner side.

A rotor 3 includes a rotor core 7 fixed to a shaft 8. As shown in FIG. 3, a plurality of magnet insertion holes 12 are formed in the rotor core 7, with a permanent magnet 6 inserted at each magnet insertion hole 12. The shaft 8 is rotatably held by a pair of bearings 10. The bearings 10 are supported by end brackets (not shown) fixed at both ends of the housing 9.

Although not shown, a magnetic pole position detector, which detects the positions of the permanent magnets 6 installed in the rotor 3, and an encoder, which detects the rotational position of the rotor 3, are disposed close to an end face of the rotor 3. Based upon the magnet positions detected via the magnetic pole position detector and the rotational position detected via the encoder, the operation of the rotating electrical machine 1 is controlled by the control device 130 shown in FIG. 1. It is to be noted that while the invention is described by assuming that it is applied to a permanent magnet rotating electrical machine, the present invention, which is characterized by the stator thereof, may similarly be applied to an induction machine or a reluctance motor.

The stator core 4 includes a cylindrical yoke portion 21 and a plurality of teeth 22 extending so as to project inward along the radial direction from the inner circumferential surface of the yoke portion 21. A plurality of teeth 22 are formed with predetermined intervals along the circumferential direction on the inner circumferential surface of the yoke portion 21.

A rotor core 7 of the rotor 3 is constituted of a magnetic material having a high magnetic permeability. The rotor core 7 may be formed by, for instance, laminating a plurality of magnetic steel sheets in the axial direction. First the rotor core is formed by laminating the magnetic steel sheets, each punched through to form the magnet insertion holes 12 and a hole for inserting the shaft 8. Then into thus formed axial through-holes, the magnet insertion holes 12 and the shaft insertion hole, the permanent magnets 6 and the shaft 8 are inserted respectively, thus forming the rotor 3. The permanent magnets 6 are inserted in the magnet insertion holes 12 of the rotor core 7 so that each pair of permanent magnets 6 assuming positions next to each other have opposite polarities in a side-by-side positional arrangement along the circumferential direction.

As shown in FIG. 3, the rotor core 7 is made up with two separate portions, i.e., a yoke portion 31 which is an inner part according to the radial direction and an outer circumferential portion 32 which is an outer part according to the radial direction. The outer circumferential portion 32 of the rotor core 7 can be further divided into two different sub-portions along the circumferential direction, with each sub-portion being either an auxiliary magnetic pole portion 33 or a magnetic pole piece portion 34. The magnetic pole piece portions 34 are constituted with areas of the outer circumferential portion 32 of the rotor core 7, which are located outer than the permanent magnets 6. These areas form a magnetic circuit as magnetic fluxes originating from the permanent magnets 6 flow into the stator 2 via gaps. The auxiliary magnetic pole portions 33, on the other hand, are constituted with areas each located between two magnet insertion holes 12 formed next to each other, through which areas a magnetic flux is generated on the stator 2 side by the magnetomotive force of the stator 2, bypassing the magnetic circuit formed with the permanent magnets 6.

The outer sides of the magnet insertion holes 12 are covered in the circumferential direction with the auxiliary magnetic pole portions 33, and are further surrounded in the circumferential direction with the magnetic pole piece portions 34. With the permanent magnets 6 housed in such magnet insertion holes 12, an electric motor optimal for high-speed rotation can be achieved.

—First Embodiment—

Figure 4:
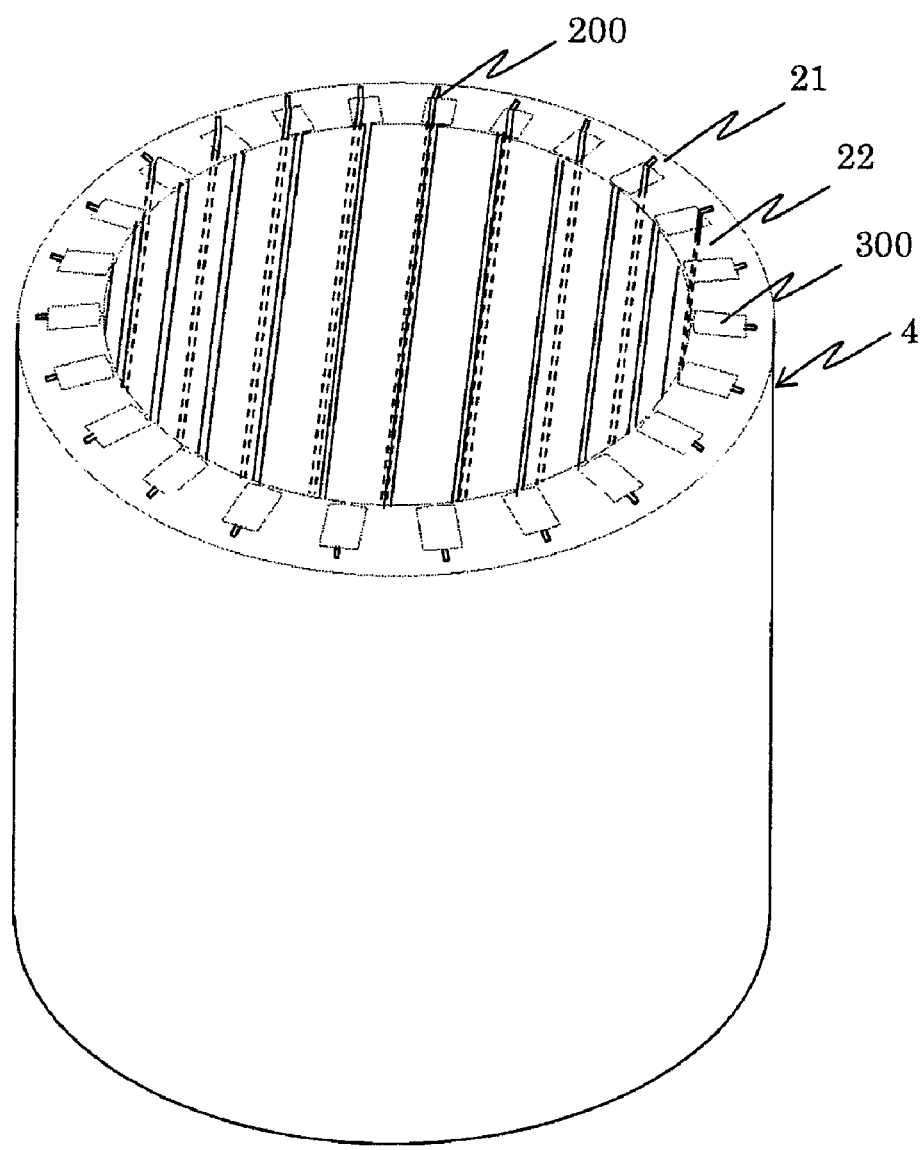
FIG. 4 is a perspective of the stator core 4, in reference to which the rotating electrical machine achieved in a first embodiment of the present invention is described.

FIGS. 4 and 5 illustrate the rotating electrical machine achieved in the first embodiment of the present invention.

Figure 5A:
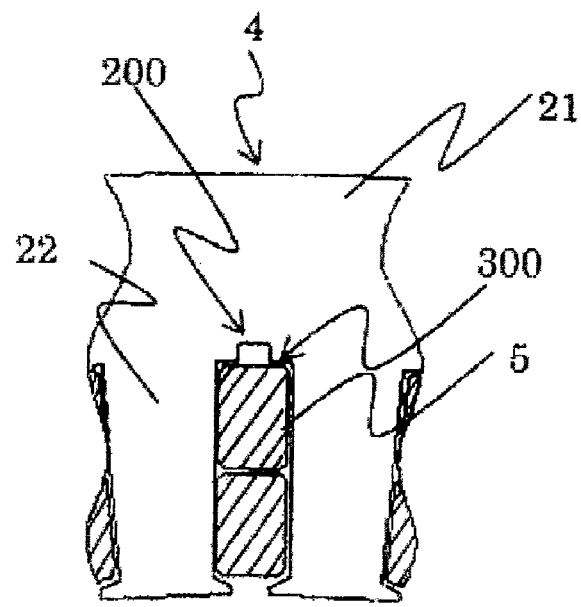
FIGS. 5A and 5B show the stator core 4 over an area near a slot 300, where FIG. 5A presenting a first example of a slot structure and FIG. 5B presenting a second example of a slot structure.
Figure 5B:
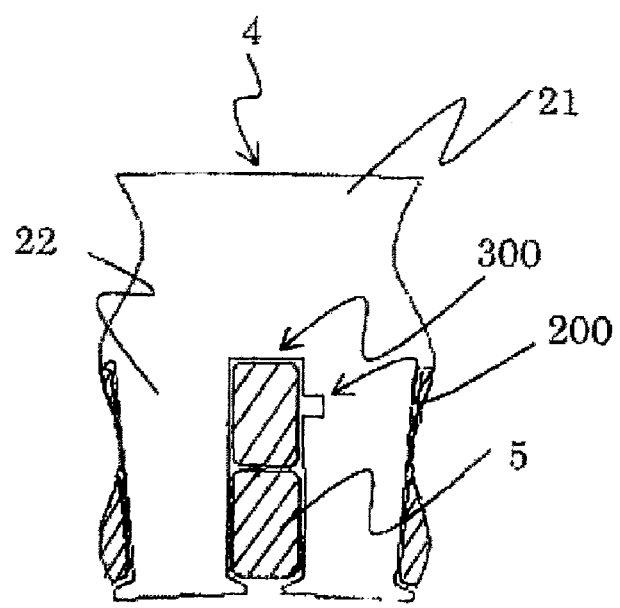

FIG. 4 shows a perspective view of the stator core 4. FIG. 5A and FIG. 5B show the stator core 4 over an area around a slot 300, where FIG. 5A presenting a first example of a slot structure and FIG. 5B presenting a second example of a slot structure.

A plurality of slots 300 are formed on the inner side of the stator core 4 in its circumferential direction with equal intervals. In the embodiment, a groove 200, which serves as a cooling medium path, is formed at a wall surface of each slot 300. Such grooves 200 are each formed so as to go through from one end face of the stator core 4 to the other end face of the stator core 4. In addition, the slots 300, the teeth 22 and the grooves 200 all assume a twisted structure, i.e., a skew structure, so as to twist around the central axis of the stator core 4. While the stator core 4 is formed by laminating a plurality of magnetic steel sheets in the axial direction, a skew structure such as that shown in FIG. 4 can be achieved by twisting the stator core 4 (laminated assembly) around the central axis together with the installed stator winding.

While the grooves 200 in the example presented in FIG. 4 are each formed on the wall surface (slot bottom surface) located in the yoke portion 21, as shown in FIG. 5A, the grooves 200 may instead each be formed at a wall surface (slot side surface) located toward a tooth 22, as shown in FIG. 5B. In either case, the grooves 200 will be skewed together with the slots 300. The stator winding 5 is housed inside the slots 300. Cooling medium paths are formed with the grooves 200 and the stator winding 5 facing to the grooves or an insulating material (varnish or the like) present within the slots. It is to be noted that while a single groove 200 is formed in correspondence to a slot 300 in the examples presented in FIG. 5A and FIG. 5B, two or more grooves may be formed in each slot. In addition, grooves may be formed both on the slot bottom surface and on the slot side surface. The more grooves 200 are provided, the larger quantity of cooling medium can be delivered, and thus enhancing the cooling performance.

Figure 6A:
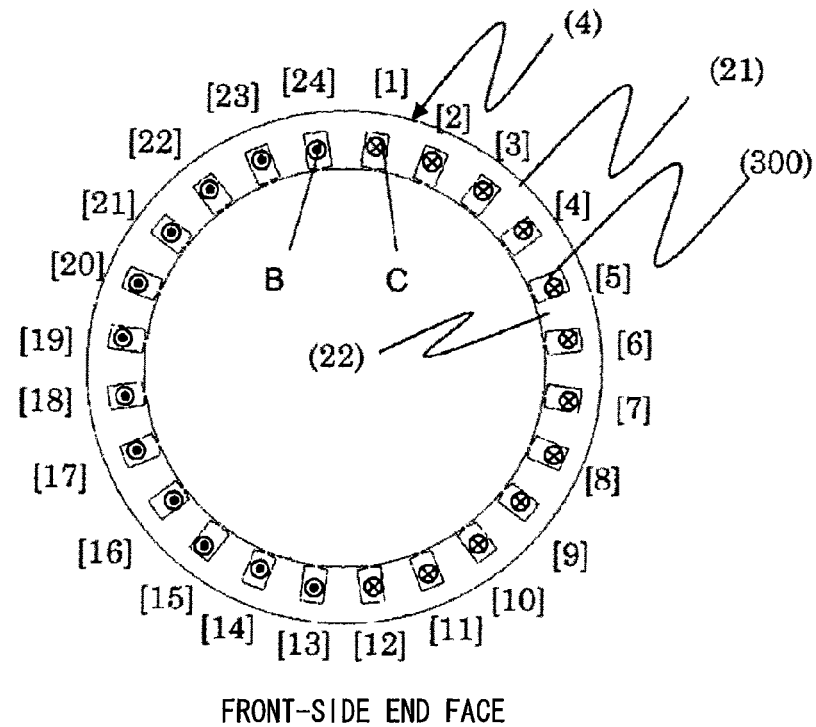
FIGS. 6A and 6B present views of the stator core 4 taken along the axial direction, where FIG. 6A showing one end face of the stator core 4 and FIG. 6B showing the other end face of the stator core 4.
Figure 6B:
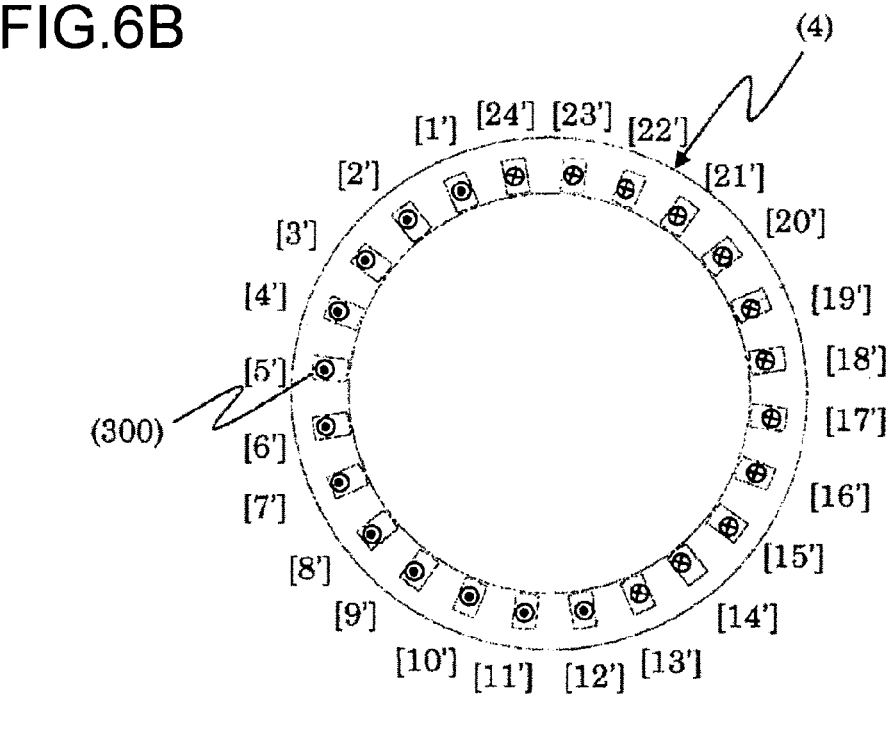
Figure 7:
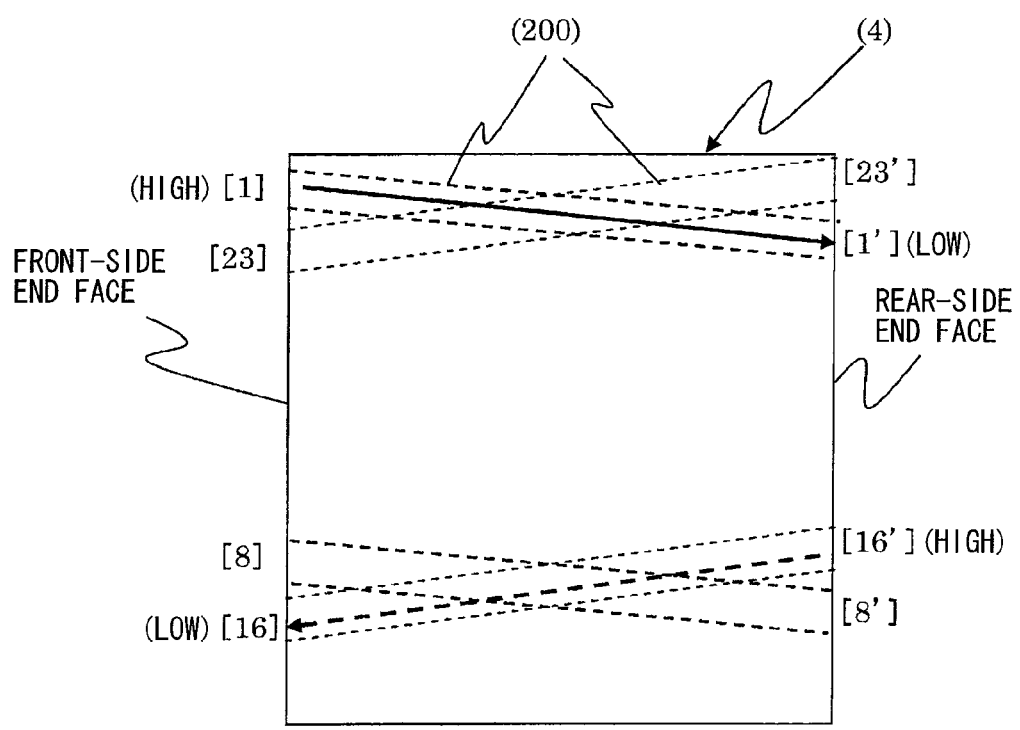
FIG. 7 is a side view of the stator core 4 installed horizontally.

In reference to FIGS. 6A and 6B, and to FIG. 7, the skew structure is described in further detail. FIG. 6 shows the stator core 4 viewed from the axial direction, where FIG. 6A illustrating one end face of the stator core 4 and FIG. 6B illustrating the other end face of the stator core 4. In addition, FIG. 7, which shows a side view of the stator core 4 placed horizontally, provides a schematic illustration of the shapes of the grooves 200 in the axial direction. FIG. 6A shows the end face located on the left side in FIG. 7 (hereafter referred to as a front-side end face), whereas FIG. 6A shows the end face located on the right side in FIG. 7 (hereafter referred to as a rear-side end face). It is to be noted that FIGS. 6A and 6B do not include an illustration of the grooves 200, while the grooves 200 are indicated by dotted lines in FIG. 7.

The symbols indicated by letters B and C in FIG. 6A respectively show the directions that the cooling medium flows through the grooves 200 in the slots 300 to which these symbols are given. The symbol indicated by letter B shows the direction that the cooling medium flows from the rear-side end face (see FIG. 6B) of the stator core 4 toward the front-side end face (see FIG. 6A), whereas the symbol indicated by letter C shows the direction that the cooling medium flows from the front-side end face toward the rear-side end face. Namely, the symbol indicated by letter B shows the outflow side of the cooling medium, whereas the symbol indicated by letter C shows the inflow side of the cooling medium.

In the example presented in FIGS. 6A and 6B, 24 slots are present, where a plurality of slots 300 respectively are assigned with numbers (1) to (24) so that they can be distinguished from one another. It is to be noted that while there are 24 slots in this example, the present invention is not limited to the 24 slots. As shown in FIG. 6A, the sequential numbers are given on the front-side end face in clockwise direction. In contrast, naturally, in FIG. 6B viewing the stator core from the rear side, the left-right relationship is reversed, where sequential numbers (1') through (24') are given in counterclockwise direction.

Since the stator core 4 is twisted around the central axis thereof to achieve the skew structure, the position of a slot 300 on the front-side end face and the position of the same slot 300 on the rear-side end face are offset relative to each other in the twisting direction, as shown in FIGS. 6A and 6B. In the example presented in FIGS. 6A and 6B, the slots are skewed by a single slot position toward the right handed direction (in clockwise direction viewed from the front side) from the front side to the rear side.

The slot 300 assigned with number (1) on the front side in FIG. 6A is the same as the slot 300 assigned with number (1') on the rear side in FIG. 6B. As explained above, since the slots are skewed in clockwise direction by a single slot position, the slot 300 assigned with number (1) in FIG. 6A is twisted, and thus shifted to the position corresponding to the position taken up by the slot assigned with numeral (2) on the rear-side end face, as shown in FIG. 6A This position is indicated by number (1') in FIG. 6B.

In the example presented in FIG. 6A, the stator core 4 is installed horizontally so that the slots assigned with numbers (1) and (24) are in similar vertical positions. Since the grooves 200 are respectively skewed relative to the central axis of the stator core 4, the vertical positions of the grooves 200 provided in the slots 300 with numbers (1) to (11) in FIG. 6A are higher than the those vertical positions on the rear-side end face, as shown in FIG. 7 with the grooves 200 with numbers (1) and (8) on the front-side end face. On the contrary, the vertical positions of the grooves 200 provided in the slots 300 on the front end face with numbers (13) to (23) in FIG. 6A are lower than those of the corresponding grooves on the rear-side end face, as shown for the grooves 200 with numbers (16) and (23) on the front-side end face in FIG. 7.

It is to be noted that when the slots are skewed by a single slot position, the vertical positions of the slots 300 assigned with numbers (12) and (24) on the front-side end face respectively become similar to those on the rear-side end face. However, if the stator core 4 is installed so as to place the slot 300 assigned with number (1) to be on the highest position, i.e., so that the line connecting the slots 300 assigned with number (1) and number (13) coincides with the vertical direction, the vertical positions of the grooves 200 provided in the slots 300 with numbers (1) to (12) will become higher on the front-side end face, and the vertical positions of the grooves 200 provided on the slots 300 with numbers (13) to (24) will become higher on the rear-side end face.

In the embodiment of the present invention, the cooling medium is supplied to the grooves 200 provided in the slots 300 with numbers (1) to (12) from the front-side end face (higher positions of these grooves), and the cooling medium is supplied to the grooves 200 provided in the slots 300 with numbers (13) to (24) from the rear side end face (higher positions of these grooves). The cooling medium supplied on a higher vertical position will flow from this higher position to the lower position due to gravity, as indicated by the solid line arrow or the dotted line arrow.

Figure 8A:
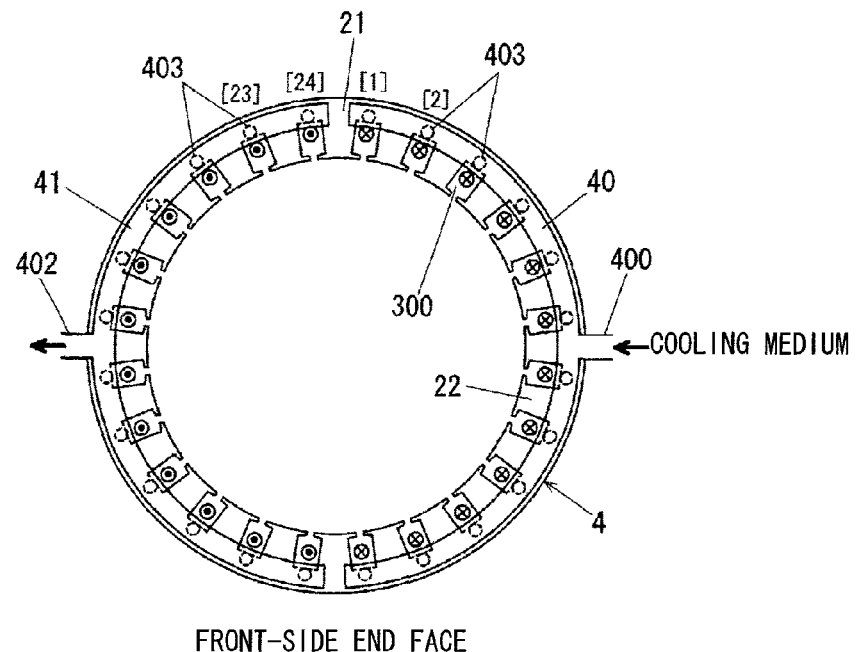
FIGS. 8A and 8B present an example of a cooling medium piping system, where FIG. 8A showing the front-side end face of the stator core 4 and FIG. 8B showing the rear-side end face of the stator core 4.
Figure 8B:
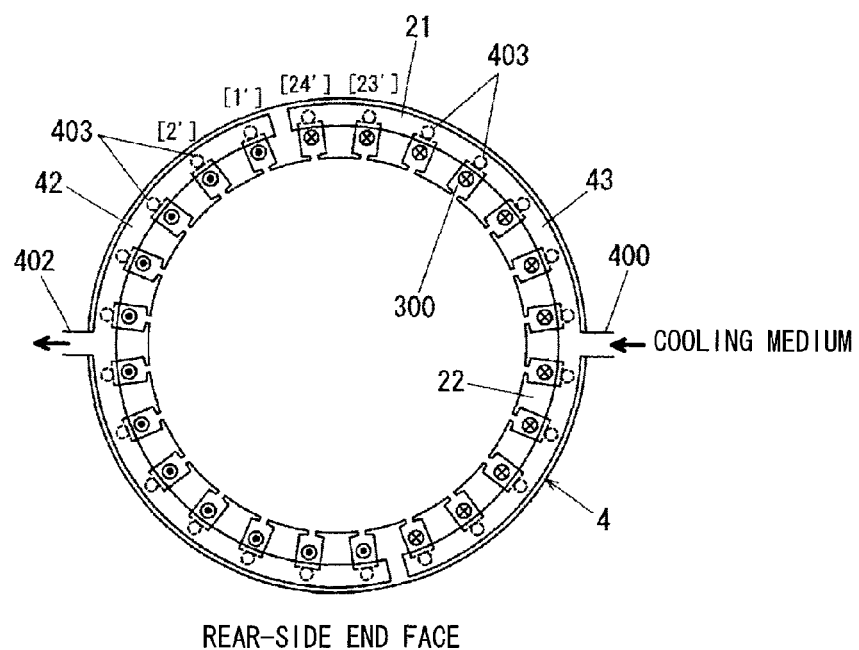
Figure 9:
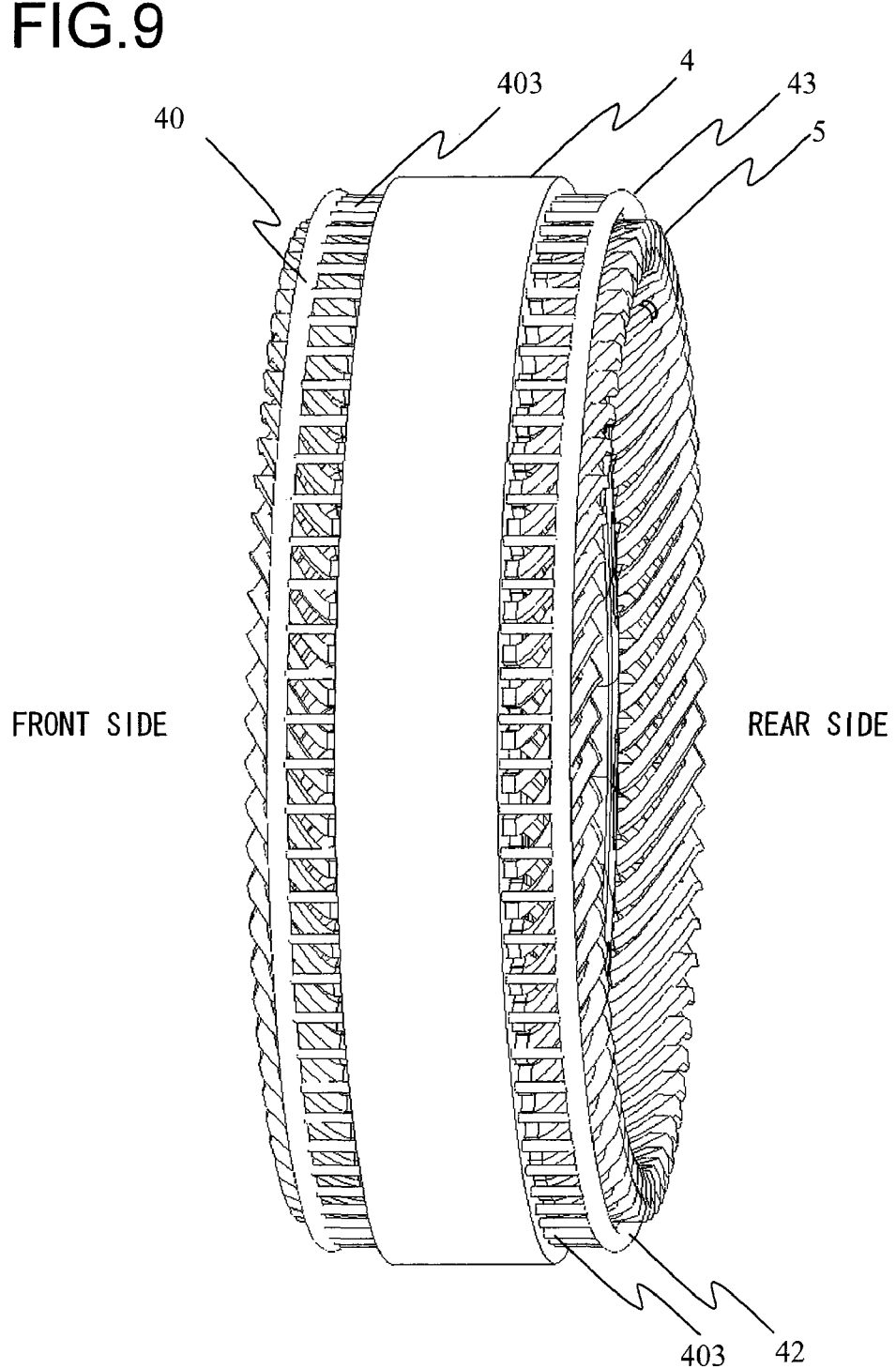
FIG. 9 is a perspective presenting an external view of the stator core 4 shown in FIGS. 8A and 8B, together with stator coils installed therein.

FIGS. 8A, 8B, and 9 present an example of a set of cooling medium piping that may be provided on the two end faces of the stator core 4. FIG. 9 shows a perspective view of the stator core 4 with the stator windings and the piping installed therein. FIG. 8A shows the piping structure viewed from the front side, whereas FIG. 8B shows the piping structure viewed from the rear side. As shown in FIG. 8A, pipes 403, connected respectively to the grooves 200 of the slots assigned with numbers (1) through (12) (see FIG. 6A), an inflow-side circular pipe 40, to which the pipes 403 are connected, the pipes 403 connected respectively to the grooves 200 of the slots assigned with numbers (13) through (24) (see FIG. 6A) and an outflow-side circular pipe 41 connected to these pipes are disposed on the front-side end face.

In addition, in FIG. 8B, pipes 403, connected respectively to the grooves 200 of the slots assigned with numbers (1') through (12') (see FIG. 6B), an outflow-side circular pipe 42, to which the pipes 403 are connected, the pipes 403 connected respectively to the grooves 200 of the slots assigned with numbers (13') through (24') (see FIG. 6B) and an inflow-side circular pipe 43 connected to these pipes are disposed on the rear-side end face. The circular pipe 40 to 43 are disposed on the outer circumferential side of the coil ends, as shown in FIG. 9. It is to be noted that the pipes 400 and 402 are omitted in FIG. 9. While the pipes 403 may be connected to the grooves 200 by firmly attaching the front ends of the pipes 403 to the end faces of the stator core 4 by welding or the like, the piping system as a whole should be firmly fixed onto the housing 9, and the front ends of the pipes 403 should be positioned so that they are tightly attached to the end faces of the stator core 4.

It should be noted that the circular pipes 41 and 42 and their associated pipes 403 for returning the cooling medium may be omitted, and that the cooling medium may flow out of the grooves 200 into the housing 9 and then the cooling medium collected in the housing 9 may be returned via an outlet piping provided in the housing 9. In such a case, the pipes 403 associated with the pipes 40 and 43 do not need to be tightly attached to the end faces of the stator core 4 and instead, they may be installed with a small gap. While such structure would assume the cooling medium poured into the inlet of the grooves 200 from the pipes 403, the cooling medium flows toward the outlet, exploiting the height difference due to the slope of the grooves 200.

As shown in FIGS. 8A and 8B, the cooling medium is supplied via the pipes 400 into the inflow-side circular pipes 40 and 42. An ATF (Automatic Transmission Fluid) is used as cooling medium in this embodiment, and is supplied by an oil pump or the like. The cooling medium delivered into the inflow-side circular pipes 40 and 42 flows into the individual grooves 200 via the pipes 403 connected to the circular pipes 40 and 42. The cooling medium having flowed into the grooves 200 then flows from higher positions to lower positions, as indicated by the arrows in FIG. 7. Upon reaching the lower positions on the end faces, the cooling medium flows into the outflow-side circular pipes 41 and 43 via the pipes 403. The cooling medium, having flowed into the outflow-side circular arc pipes 41 and 43, then returns to the cooling medium supply source via the pipes 402.

As described above, the grooves 200 are formed on the slot wall surfaces to constitute the cooling medium paths in the first embodiment, and are made to slope relative to the central axis of the stator core 4 by twisting the entire laminated body of the stator core 4 so as to skew the slots 300. As a result, a difference in the potential energy level will be created along the axial direction, as illustrated in FIG. 7, which, in turn, will allow the cooling medium to flow smoothly along the axis of the stator core 4 when the rotating electrical machine is installed horizontally. Consequently, the heat generated as an electrical power is supplied to the stator winding 5 in the slots can be removed efficiently.

In addition, since the cooling medium paths are constituted with the grooves 200 formed on the wall surfaces of the slots 300, a cooling medium pipe does not need to be installed within the stator core 4 as used in the conventional structure, allowing usage of less number of required components.

It is to be noted that by creating a skew of the stator core 4, the higher harmonic components in the torque pulsation can be mostly canceled out, which, in turn, will make it possible to reduce the cogging torque, the torque pulsation and the electromagnetic noise. With this structure, which requires fewer components compared to a rotating electrical machine with a skewed rotor, the manufacturing can be reduced.

—Second Embodiment—

Figure 10A:
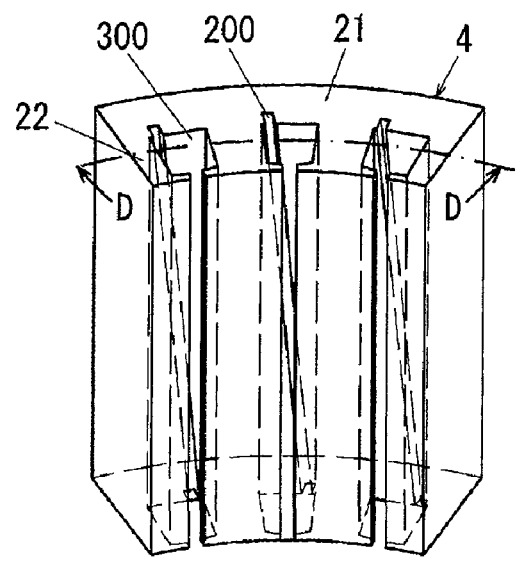
FIGS. 10A and 10B illustrate a second embodiment of the rotating electrical machine according to the present invention.
Figure 10B:
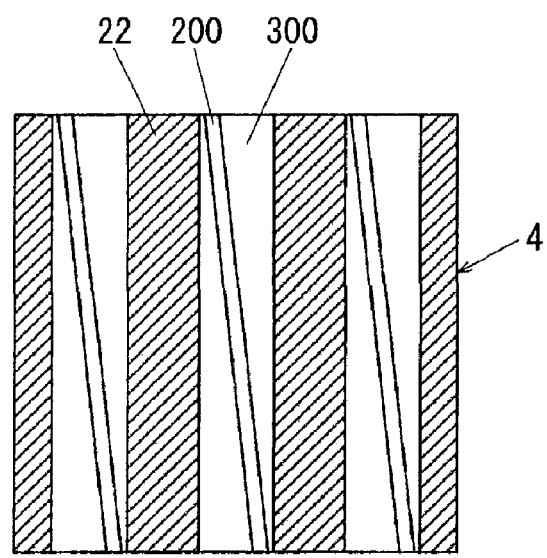

FIGS. 10A and 10B illustrate the second embodiment of the present invention. In the first embodiment described above, the skew structure of grooves 200 is, formed by twisting the entire laminated body constituting the stator core 4, and thus the grooves 200 are inclined relative to the central axis of the stator core 4. In contrast, the second embodiment is distinguishable from the first embodiment in that the slots 300, which houses the stator winding 5 and the teeth 22, extend parallel to the central axis of the stator core 4, and that only the grooves 200 are inclined relative to the central axis.

FIG. 10A shows a perspective view of a portion of the stator core 4, whereas FIG. 10B is a sectional view taken along D-D in the FIG. 10A. A groove 200 is formed on the bottom side of each slot 300 (on the wall surface located toward the yoke portion 21). It is to be noted that two or more grooves 200 may be formed. While the grooves 200 are formed in advance in each of the steel sheets to be laminated in the first embodiment, the grooves 200 in the second embodiment are formed after the steel sheets have been laminated to make up the stator core 4. In this structure, a stator winding 5 or an insulating material is present in the slot at the position facing to each groove 200 and thus, a cooling medium path is formed between the groove and the stator winding or the insulating material.

It is to be noted that the cooling medium supply method is similar to that of the first embodiment, and therefore here the explanation about the method is omitted.

In the second embodiment, again, the grooves 200 constituting the cooling medium paths are made to slope relative to the central axis of the stator core 4, and thus, a difference in the potential energy level will be created between the inlet end and the outlet end of each groove 200 in the rotating electrical machine installed horizontally. Thus, the cooling medium delivered flows more smoothly by taking advantage of the difference in the potential energy level, which also enables to remove the heat generated as electrical power is supplied to the stator winding 5 with greater efficiency. In addition, since the cooling medium paths are constituted with the grooves 200, the cooling medium pipes as used conventionally do not need to be installed, thereby achieving usage of less number of required components.

—Third Embodiment—

Figure 11A:
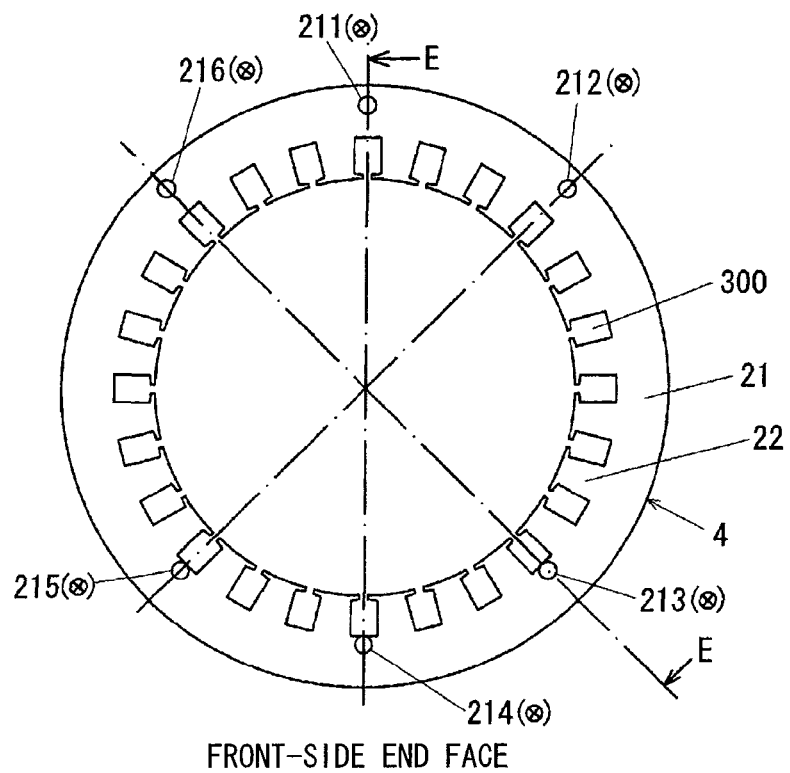
FIGS. 11A and 11B illustrate a third embodiment of the rotating electrical machine according to the present invention, where FIG. 11A showing the front-side end face of the stator core 4 and FIG. 11B showing the rear-side end face of the stator core 4.
Figure 11B:
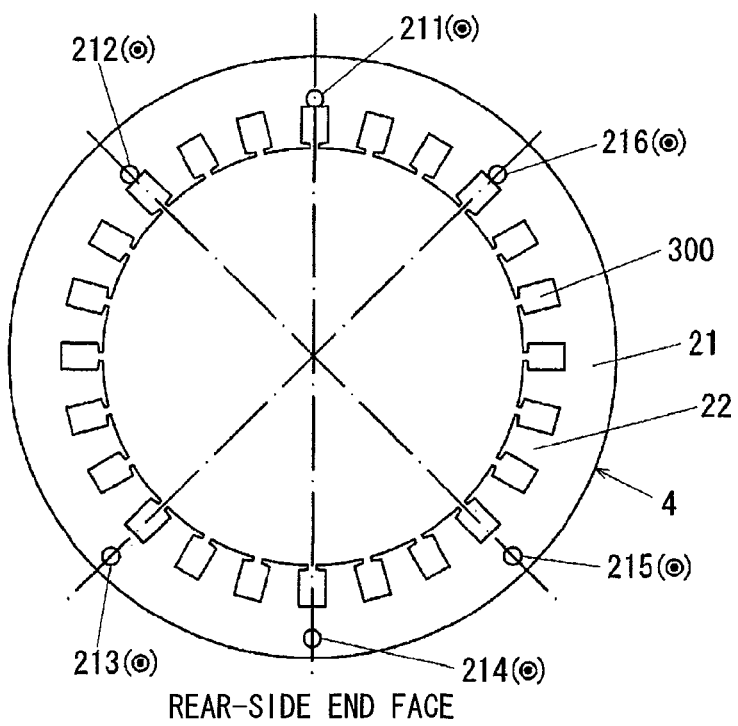
Figure 12:
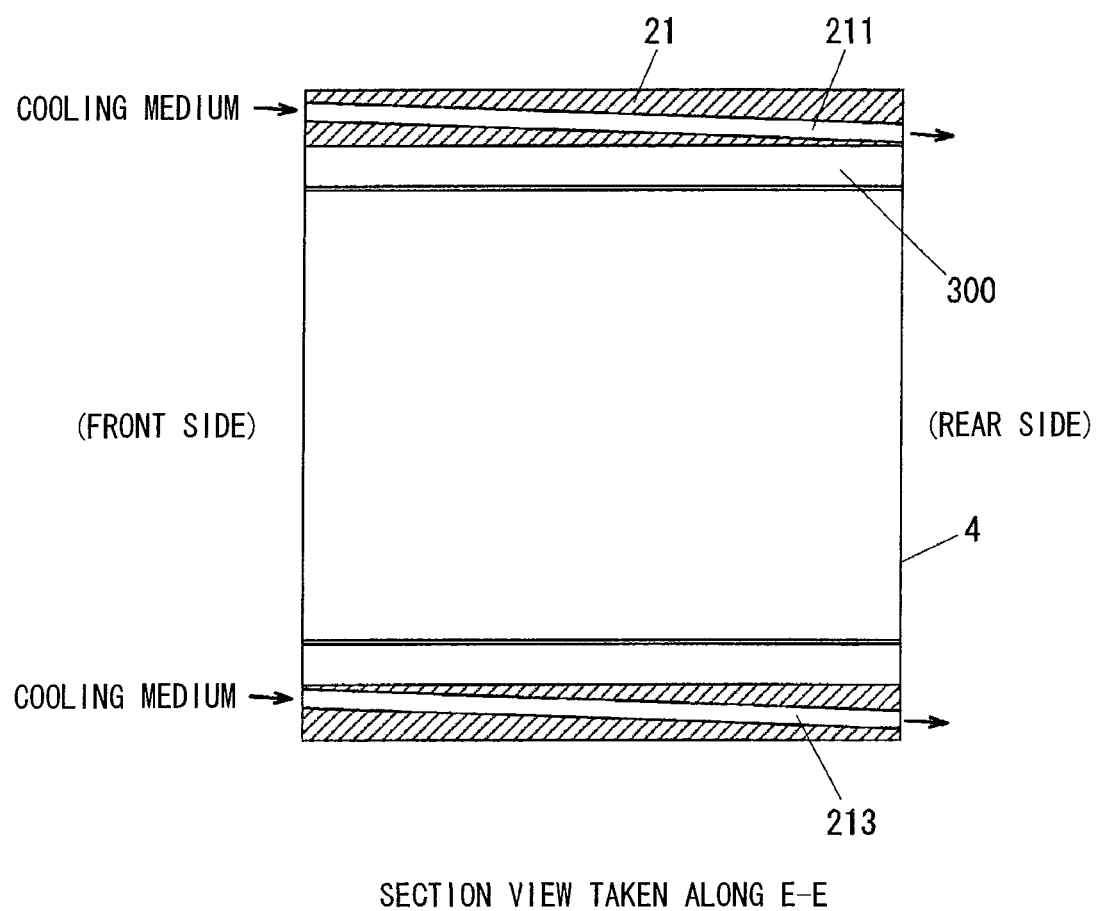
FIG. 12 is a sectional view taken along A-A in FIG. 11A.

FIGS. 11A, 11B, and 12 illustrate the third embodiment of the rotating electrical machine according to the present invention. FIG. 11A shows the front-side end face of the stator core 4, whereas FIG. 11B shows the rear-side end face of the stator core 4. FIG. 12 is a sectional view taken along E-E in FIG. 11A.

While a groove 200 is formed on the wall surface of each slot 300 in the first and second embodiments described above, through holes 211 to 216 serving as cooling medium paths, are formed in the stator core 4 in the third embodiment. In addition, slots 300 and teeth 22 are formed to extend parallel to the central axis of the stator core 4 without twisting, similar to the second embodiment.

As shown in FIGS. 11A and 11B, the through holes 211, 212 and 216 are formed so that the openings on the front-side end face (cooling medium inflow ports) are provided closer to the outer circumferential surface of the stator core 4, and the openings on the rear-side end face (cooling medium outflow ports) are provided closer to the bottom surfaces of slots 300. In contrast, the through holes 213 to 215 are formed so that the openings on the front-side end face (cooling medium inflow ports) are provided closer to the bottom surfaces of slots 300, and the openings on the rear-side end face (coolant outflow ports) are provided closer to the outer circumferential surface of the stator core 4. Thus, the through holes 211 to 216 each extend with a slope relative to the central axis of the stator core 4, and when the stator core 4 is installed horizontally, as shown in FIG. 12, the through holes 211 to 216 will each assume a greater height on the front-side end face, to allow the cooling medium to transfer from the front-side end face toward the rear-side end face in a natural flow. It is to be noted that the number of such through holes is not limited to six. In addition, while the through holes 211 to 216 are formed in the yoke portion 21, cooling medium through holes may instead be formed in teeth 22 or through holes may be formed both in the yoke portion and the teeth.

In the third embodiment, the through holes 211 to 216 are formed with a slope relative to the central axis of the stator core 4, and thus when the rotating electrical machine is installed horizontally, the cooling medium can flow more smoothly, since for flowing the cooling medium flow the difference in the potential energy level is exploited, resulting in an effective removal of heat generated as electrical power is supplied to the stator winding 5. In addition, since the through holes used as coolant paths are formed in the stator core 4, the cooling medium pipes are not needed, thereby enabling usage of less number of required components.

(Variation)

Among the through holes 211 to 216 shown in FIGS. 11A and 11B, a through hole located distant in the vertical direction from the axial center of the stator core 4 assumes a steeper slope to the vertical direction. However, when through holes are formed similarly in correspondence to slots 300 located distant in the left/right direction in the figure (i.e. in the horizontal direction when the stator core 4 is installed horizontally), the slope of the through holes to the vertical direction is bound to be extremely small.

Figure 13A:
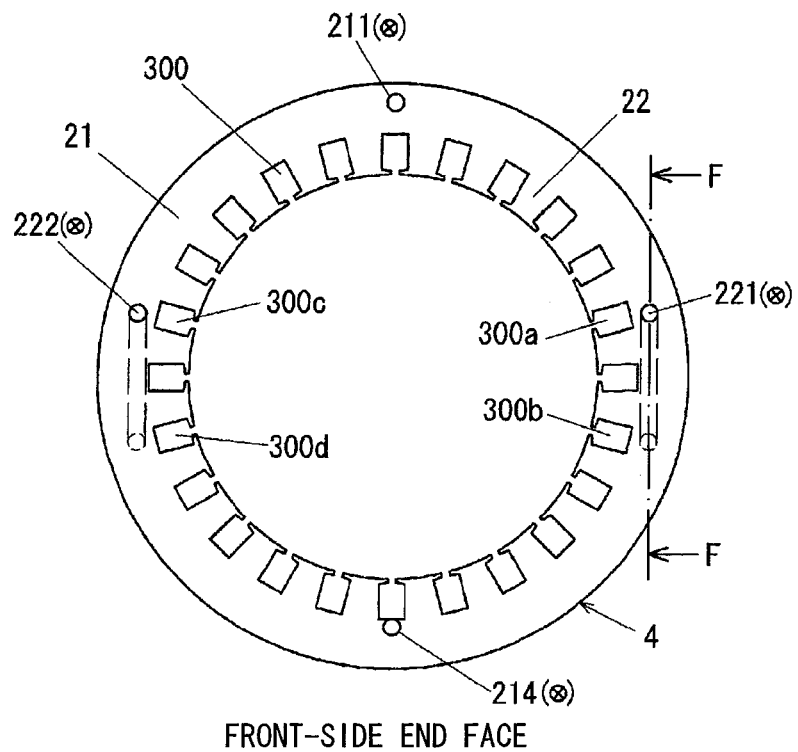
FIGS. 13A and 13B illustrate a variation of the third embodiment.
Figure 13B:
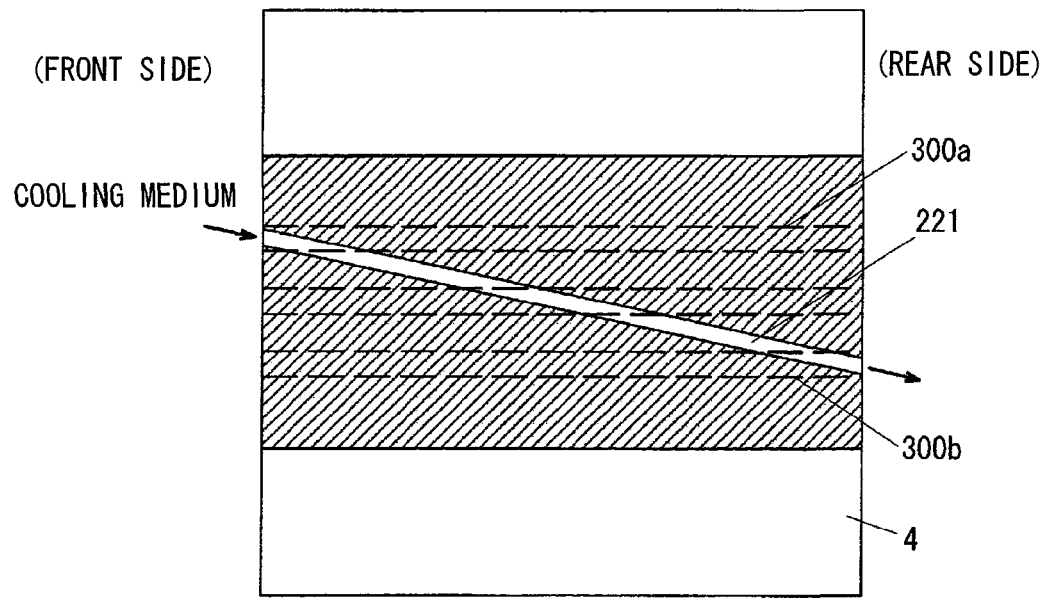

Accordingly, in the variation illustrated in FIGS. 13A and 13B, through holes 221 and 222 formed on the right side and the left side respectively in the stator core 4 installed horizontally as in the figures are made to incline within a vertical plane. FIG. 13A shows the front-side end face of the stator core 4, whereas FIG. 13B is a sectional view taken along F-F in FIG. 13A. It is to be noted that holes 211 and 214 formed respectively on the upper side and the lower side of the stator core 4 assume structures similar to those shown in FIGS. 11A and 11B.

A cooling medium inflow opening of the through hole 221 is formed in the yoke portion 21 near the bottom surface of a slot 300a on the front-side end face, whereas a cooling medium outflow opening of the through hole 221 formed in the yoke portion 21 on the rear-side end face, takes a position near the bottom surface of a slot 300b located at a position achieving symmetry with the position of the slots 300a. As a result, the through hole 221 achieves a greater height on the front side than on the rear side, allowing the cooling medium to flow naturally due to the difference in the potential energy level.

The through hole 222 adopts a similar structure. Namely, a coolant inflow opening of the through hole 222 is formed in the yoke portion 21 near the bottom surface of a slot 300c on the front-side end face, whereas a cooling medium outflow opening of the through hole 222, formed in the yoke portion 21 on the rear-side end face takes a position near the bottom surface of a slot 300d. In the variation achieved as described above, the through holes 221 and 222 are each allowed to gain an ample slope to the vertical direction, and thus, the cooling medium can flow smoothly by exploiting the difference in the potential energy level, even on the lateral sides of the stator core 4 installed horizontally. Consequently, the stator core 4 as a whole can be cooled more uniformly.

—Fourth Embodiment—

Figure 14A:
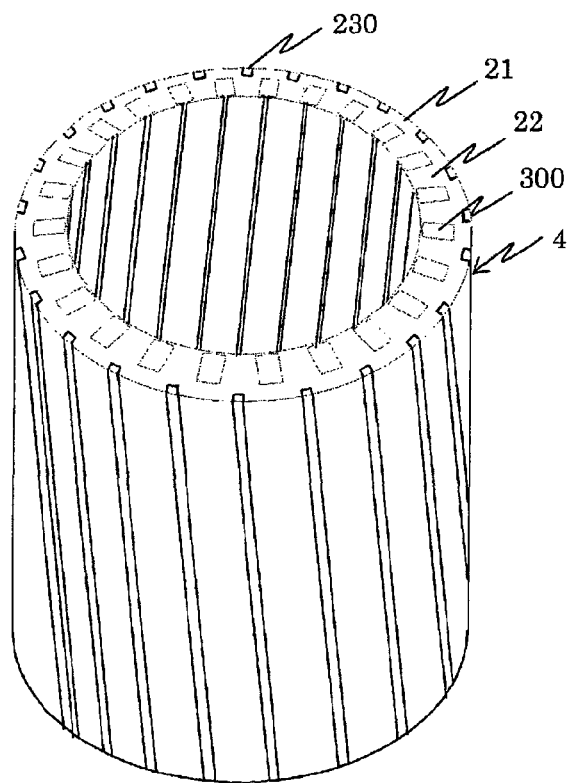
FIGS. 14A and 14B illustrate a fourth embodiment of the rotating electrical machine according to the present invention.
Figure 14B:
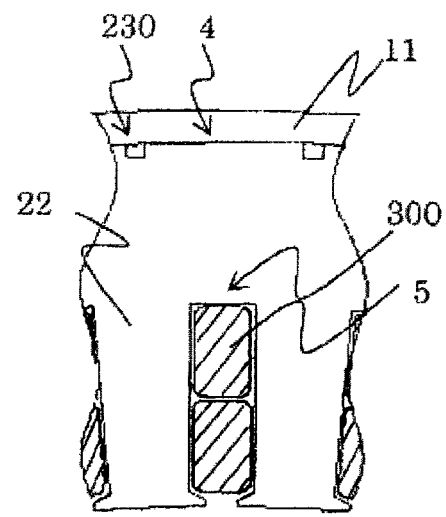

FIGS. 14A and 14B illustrate the fourth embodiment of the rotating electrical machine according to the present invention. FIG. 14A shows a perspective view of the stator core 4, whereas FIG. 14B shows a portion of around a slot 300 in the stator core 4. In the fourth embodiment, as shown in FIG. 14A, grooves 230 to constitute cooling medium paths are formed on the outer circumferential surface of the stator core 4.

As does the stator core in the first embodiment illustrated in FIG. 4, the stator core 4 assumes a skew structure. Namely, each laminated sheet constituting the stator core 4 has an identical shape, and the laminated body from these sheets is twisted around the axial center in order to skew the slots 300, the teeth 20, and the grooves 230. As a result, the grooves 230 are set with a slope relative to the central axis of the stator core 4. Since the outer circumferential surface of the stator core 4 is shielded by the housing 11, as shown in FIG. 14B, a cooling medium path is formed with each groove 230 and the housing 11.

Similarly to the grooves in the first embodiment, the grooves 230 in the fourth embodiment are inclined relative to the central axis of the stator core 4, and thus, when the stator core 4 is installed horizontally, a groove 230 located on one side relative to a vertical plane including the central axis of the stator core 4 will extend in a downhill slope from the front-side end face toward the rear-side end face, whereas a groove 230 located on the other side relative to the vertical plane will extend in a downhill slope from the rear-side end face toward the front-side end face. Thus, by supplying cooling medium through the front side opening to the groove 230 on one side and supplying the cooling medium through the rear-side opening to the groove 230 on the other side, the cooling medium is allowed to flow naturally due to the difference in potential energy level. Consequently, a smoother cooling medium flow will be assured and the heat generated as electrical power is supplied to the stator winding 5 will be removed with great efficiency.

In addition, since cooling medium paths are formed with the grooves 230 and the housing 11, no additional piping members, such as pipes, are not necessary, thereby achieving a reduction in the number of required components. Furthermore, by providing a skew to the stator, the higher harmonic components in the torque pulsation can be mostly canceled out, which, in turn, makes it possible to reduce the cogging torque, the torque pulsation and the electromagnetic noise.

(Variation)

Figure 15:
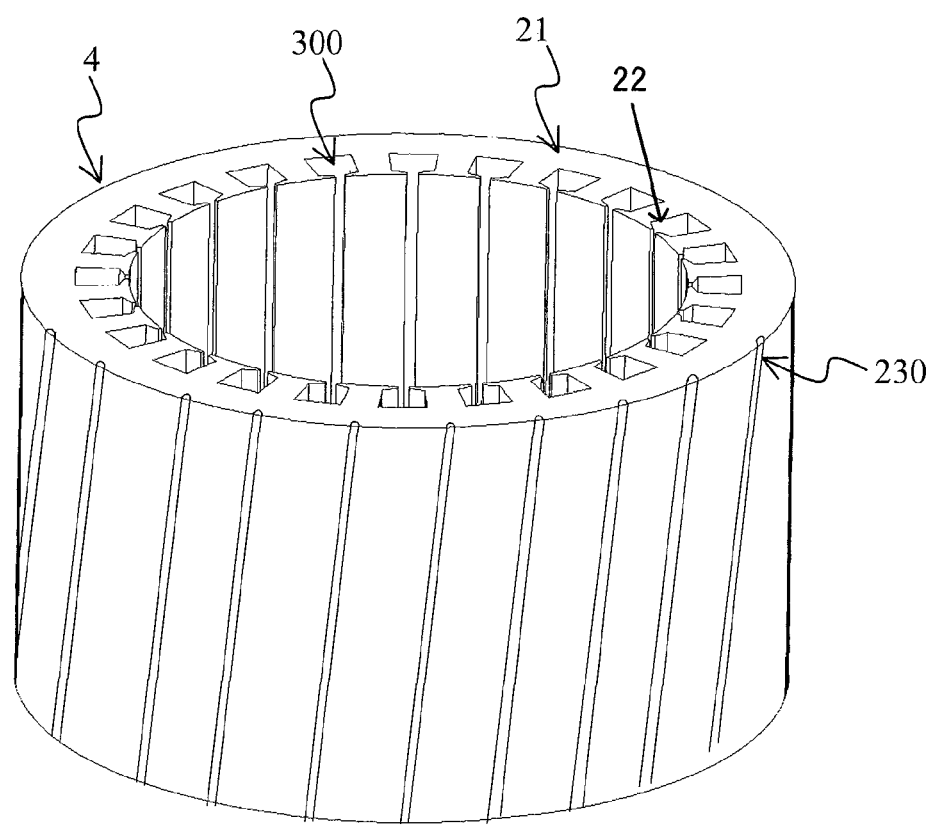
FIG. 15 illustrates a variation of the fourth embodiment.

FIG. 15 is a perspective view of the stator core 4 in the variation of the fourth embodiment described above. In the stator core 4 shown in FIG. 14A, the magnetic steel sheets each having identical shapes of cutouts to form slots 300, teeth 22 and grooves 230, are laminated one on top of another, and the laminated body is twisted around the axial center so as to skew the slots 300, the teeth 22 and the grooves 230.

For the stator core 4 shown in FIG. 15, on the other hand, once a laminated body is formed by laminating the magnetic steel sheets of identical shapes of cutouts to form slots 300 and teeth 22 one on top of another, the outer circumferential surface of the laminated body is machined for purposes of groove formation to form grooves 230 shaped similar to those in FIG. 14A. For this reason, while the grooves 230 are formed with a slope relative to the central axis of the stator core 4, the slots 300 and the teeth 22 extend parallel to the central axis. Since cooling medium paths constituted with these grooves are structurally similar to those in the fourth embodiment described above, similar advantages are achieved.

—Fifth Embodiment—

Figure 16A:
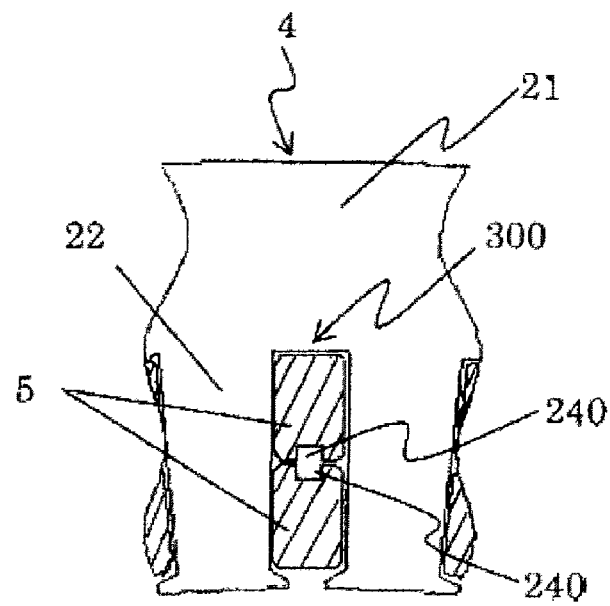
FIGS. 16A and 16B illustrate a fifth embodiment of the rotating electrical machine according to the present invention.
Figure 16B:
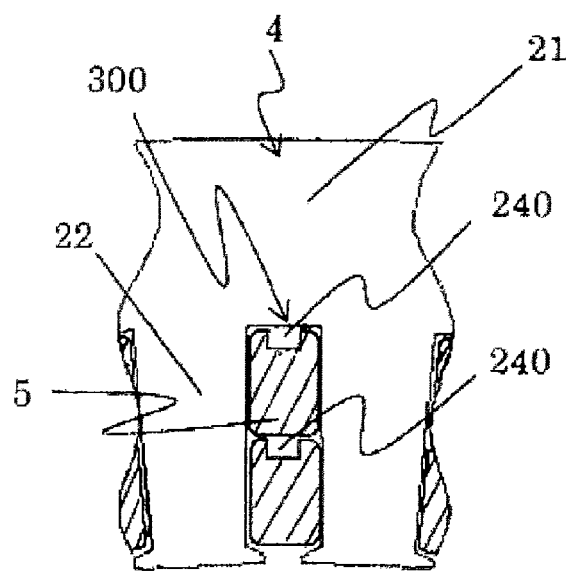

FIGS. 16A and 16B illustrate the fifth embodiment of the rotating electrical machine according to the present invention. FIGS. 16A and 16B show the enlarged views of an area around a slot 300 of the stator. This embodiment is characterized by the structure of its stator winding 5, in which the grooves 240 are formed in the stator windings, instead of such grooves formed as explained in the 1st embodiment. Other structural features are similar to those of the first embodiment. FIG. 16A presents a structural example for cooling medium paths and FIG. 16B presents another structural example for cooling medium paths. It is to be noted that in FIGS. 16A and 16B the housing 9 is omitted.

The stator winding wires 5 are wound around the stator core 4, and the wound around wires are housed in the individual slots 300, as shown in FIGS. 16A and 16B. On the circumferential surface of the stator winding wire 5, grooves 240 are formed along the direction in which the stator winding wire 5 extends. The grooves 240 can be formed with the stator winding wires 5 fabricated by a drawing process or the like.

In the examples presented in FIGS. 16A and 16B, a groove 240 is formed on a outward-facing surface of a winding wire having substantially a rectangular cross-section (normally referred to as rectangular wire) at its shorter side of the rectangular cross-section. In the example presented in FIG. 16A, two stator winding wires 5 are housed in each slot 300 and grooves 240 are formed on the stator winding wires so that they face each other. Thus, a cooling medium path formed by the two grooves 240 extending through the stator core 4 from the front side to the rear side.

In the alternative example presented in FIG. 16B, each stator winding wire 5 is disposed so that a groove 240 formed thereat faces toward the outer circumference of the stator core 4. As a result, separate cooling medium paths are formed, i.e., one cooling medium path between one of the grooves 240 and the wall surface of the slot 300, and another one cooling medium path between the other groove 240 and the circumferential surface of the another stator winding wire 5.

Similarly to the stator core of the first embodiment, the stator core 4 is skewed. Thus, the slots 300 each extend inclined relative to the central axis of the stator core 4, and also the stator winding wires 5 housed in the slots 300 extend inclined relative to the central axis of the stator core 4. As a result, cooling medium paths formed with the grooves 240 also extend inclined relative to the central axis of the stator core 4. This means that when the rotating electrical machine is installed horizontally, a difference in the potential energy level will be created in each cooling medium path so that the cooling medium will be allowed to flow along the rotational axis by exploiting the difference in the potential energy level. Furthermore, since on the stator windings 5 the grooves 240 are formed, and therefore the stator windings contact directly to the cooling medium, the heat generated as electrical power is supplied to the stator winding 5 will be removed with even higher efficiency, achieving better cooling performance.

It is to be noted that while a grooves 240 are formed on the shorter sides of the circumference of a stator winding wire 5, a groove may instead be formed on the longer sides of the circumference of the stator winding wire 5. Further, two or more grooves 240 may be formed.

—Sixth Embodiment—

Figure 17:
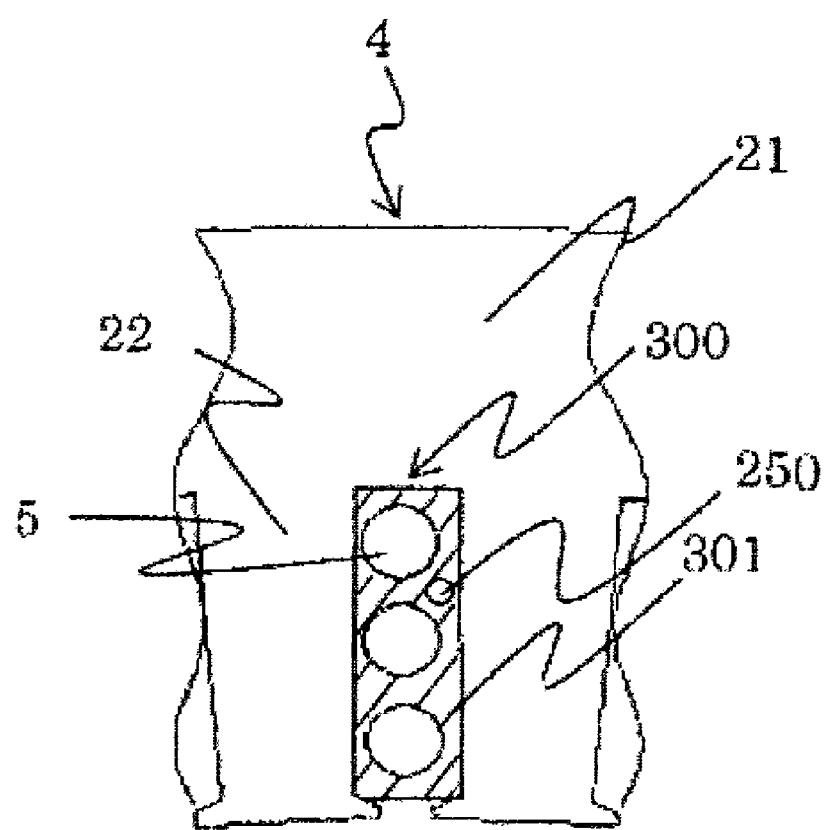
FIG. 17 illustrates the sixth embodiment of the rotating electrical machine according to the present invention.

FIG. 17 shows the sixth embodiment of the rotating electrical machine according to the present invention. In the embodiment, a cooling medium path is formed by exploiting an insulating material that is filling each slot 300 of the stator core 4. FIG. 17 shows an enlarged view of an area around a slot 300 of the stator. The embodiment is characterized by the shape of the insulating material in the slot 300, and the other structural features of the embodiment are similar to those of the first embodiment, except the grooves 240. It is to be noted that in FIG. 17 the housing 9 is omitted.

A stator winding 5 is wound around the stator core 4, and the wound around winding 5 is housed in each slot 300, as shown in FIG. 17. For a stator winding 5, a standard round wire is employed. The gaps between the stator windings 5 and the slots 300 are filled with an insulating material, for example such as varnish 301, for fixation.

A through hole 250 is formed as a cooling medium path in the varnish filled in the gaps along the extending direction (axial direction) of a slit 300 having a skew structure. For example, when filling with the varnish 301, a rod-shaped member may be inserted to a slot 300 used as a mold core for forming a cooling medium path. After filling with the varnish 301, the through hole 250 is formed by pulling out the rod-shaped member. Or, the stator core 4 that is a laminated body may be skewed after filling with the varnish 301 and forming the through hole 250. Since the slot 300 is skewed and therefore it is inclined relative to the central axis of the stator core 4, also the varnish 301 and the through hole 250 within the slot 300 extend inclined relative to the central axis of the stator core 4. It is to be noted that while only a single through hole 250 is formed in the example presented in FIG. 17, two or more through holes may be formed.

When the stator core 4 with such through holes 250 formed therein is installed horizontally, the vertical positions of through holes 250 are different between on the front-side end face and on the rear-side end face. As a result, the cooling medium will be allowed to flow along the axial direction through the through holes 250 by exploiting the difference in the potential energy level. In addition, since heat can be transferred to the cooling medium via the varnish for fixation around the stator windings 5, the heat generated in the stator windings 5 can be cooled effectively. Furthermore, since the cooling medium path is formed by exploiting the varnish 301 conventionally used as an insulator material, there is no necessity to install a pipe or the like, the number of required components can thus be reduced.

Figure 18:
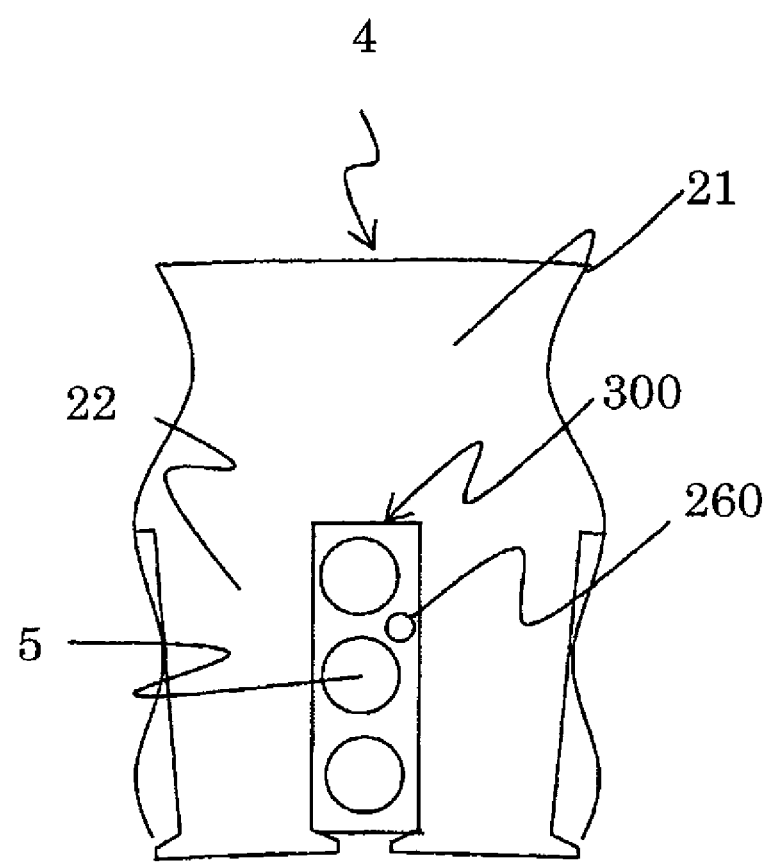
FIG. 18 illustrates a variation of the sixth embodiment.

While, in the sixth embodiment described above, a cooling medium path is formed inside each slot 300 by exploiting the varnish 301 for fixation, a cooling medium pipe 260 may be installed inside the slot 300, as shown in FIG. 18, as an alternative. When the slots 300 of the stator core 4 assume a skew structure, such pipes 260 should be installed along the extending direction of the slots 300. In contrast, if the slots 300 are not skewed and extended parallel to the central axis of the stator core 4, the pipes 260 should be installed as inclined in the slots 300. As a rotating electrical machine adopting such a structure is installed horizontally, a difference of vertical positions of a pipe is formed between the outlet side and the inlet side of the pipes 260 and, as a result, the cooling medium will be allowed to flow along the axial direction by exploiting the difference in the potential energy level.

—Seventh Embodiment—

Figure 19:
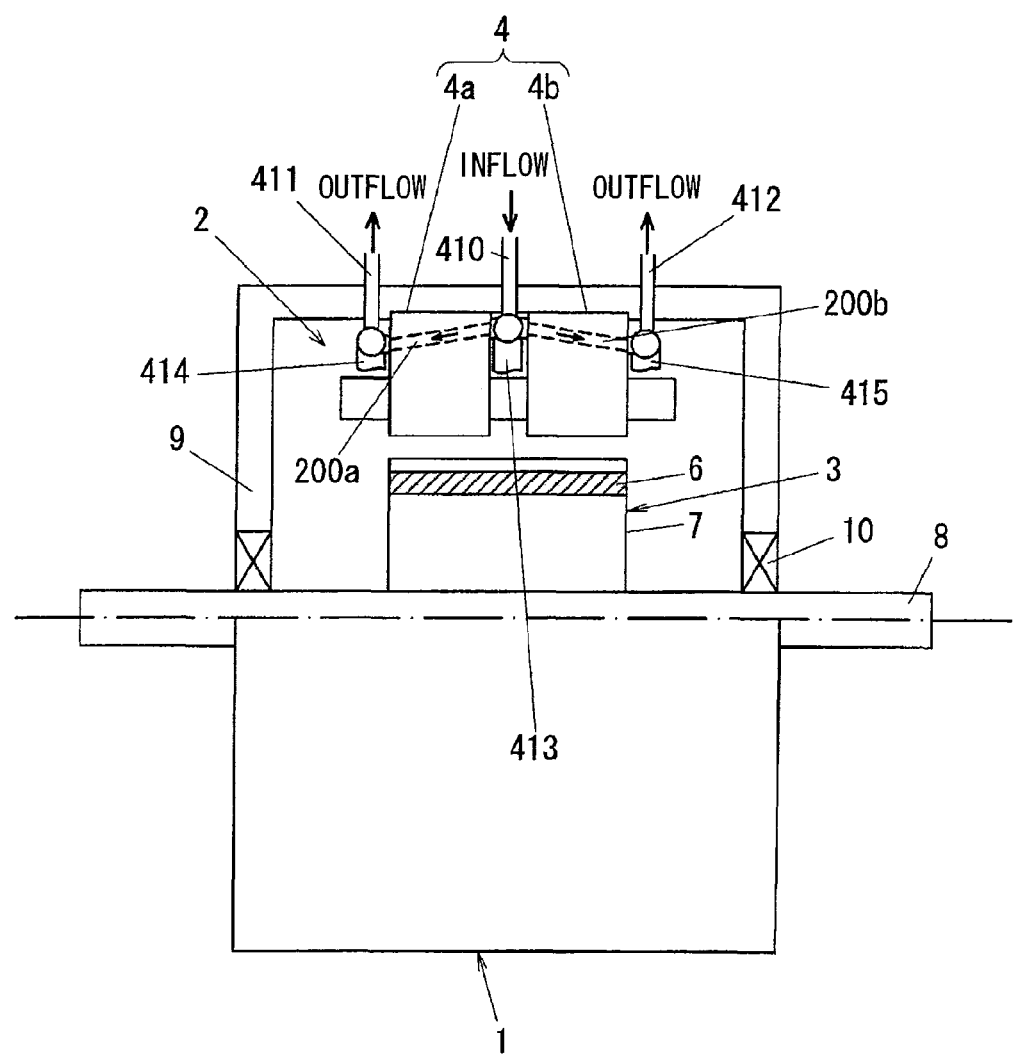
FIG. 19 illustrates the seventh embodiment of the rotating electrical machine according to the present invention.

FIG. 19 illustrates the seventh embodiment of the rotating electrical machine according to the present invention, and shows a partial sectional view of a rotating electrical machine 1 taken from the front side of the vehicle. The rotating electrical machine shown in FIG. 19 differs from the rotating electrical machine in FIG. 2 in that its stator core 4 is split into two parts along the axial direction. A pipe 410 is disposed between the two stator core parts 4a and 4b, through which the cooling medium is supplied from a cooling medium supply source (not shown) outside the rotating electrical machine.

The cooling medium delivered through the pipe 410 flows into through holes each formed in the stator core parts 4a and 4b. The through holes 200a and 200b each extend inclined as shown in FIG. 19, and the outflow port is lower than the inflow port in the vertical direction. These through holes may assume sloping structures such as those of the pipes 211 to 216 of the stator core 4 in FIGS. 11A and 11B described earlier. It goes without saying that the through holes may adopt any of the other sloping structures mentioned earlier instead of those shown in FIGS. 11A and 11B. The cooling medium having been discharged from the through holes 200a and 200b of the stator core parts 4a and 4b respectively then returns to the cooling medium supply source from the rotating electrical machine 1 via pipes 411 and 412 respectively.

Figure 20:
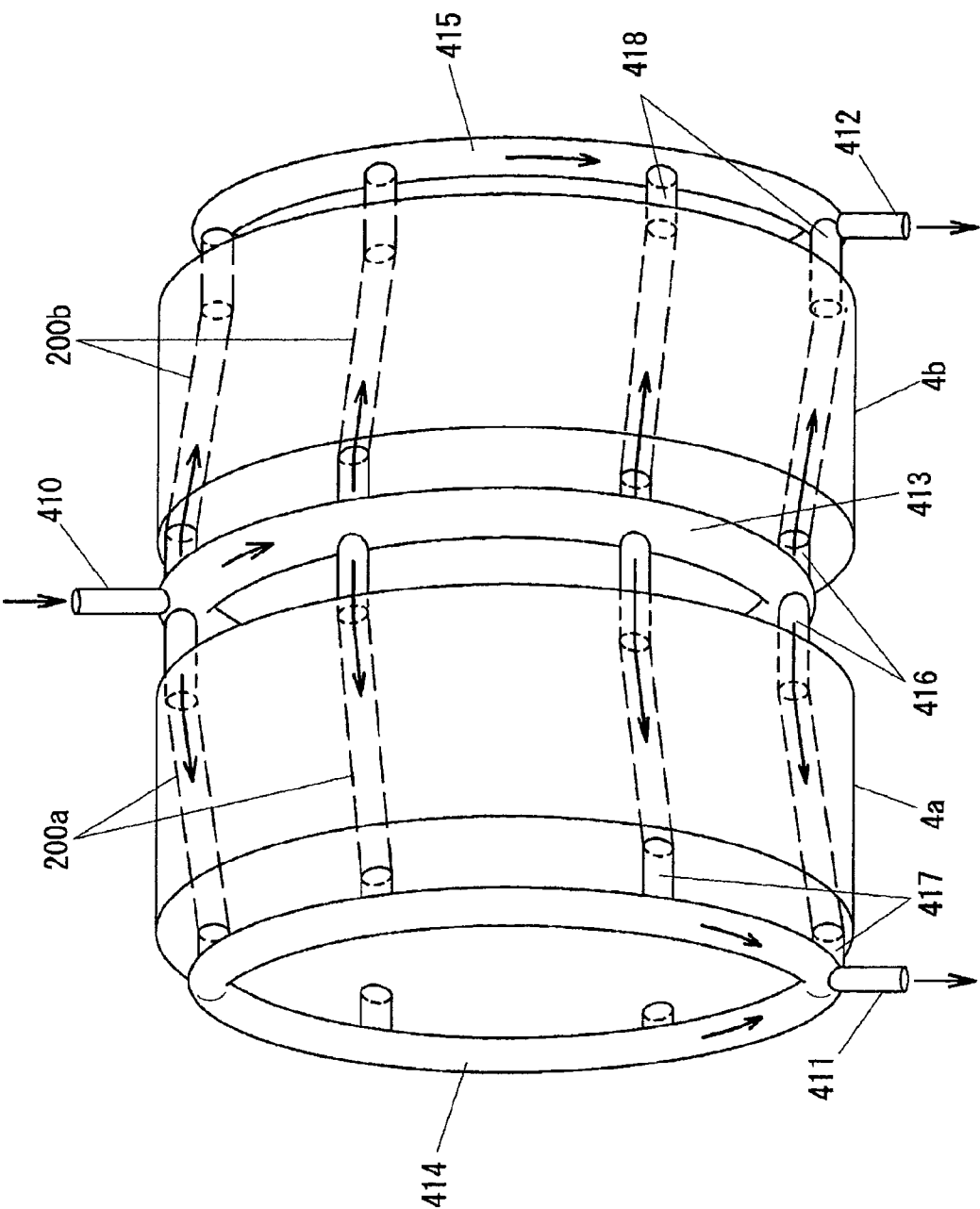
FIG. 20 illustrates a piping system through which the cooling medium is input and output.

FIG. 20 presents an example of a piping system for supplying the cooling medium to the through holes 200a and 200b of the stator core parts 4a and 4b, and also for discharging the cooling medium from the through holes 200a and 200b. It is to be noted that in FIG. 20 a detailed structures of the stator core parts 4a and 4b is omitted, in order to show the piping structure clearly. Further, the through holes 200a and 200b of the stator core 4 assume sloping structures similar to those shown in FIGS. 11A and 11B, where all the through holes assuming a higher opening position on one end face than the opening position assumed on the other end face. In the stator core parts 4a and 4b, regarding the arrangement shown in FIG. 20, each through hole assumes a higher vertical positions for the openings formed on the end face of the inner sides (inflow port) facing the end face of the other stator core part, than those formed on the end face located on the outer sides (outflow port).

A circular pipe 413 is disposed between the stator core parts 4a and 4b, with the cooling medium supply pipe 410 connected to the circular pipe 413. A plurality of connecting pipes 416 are connected to the circular pipe 413 so as to allow branching to the stator core parts 4a and 4b. These connecting pipes 416 are each connected to the inflow ports of through holes 200a or 200b.

In addition, circular pipes 414 and 415 are disposed so as to face the opposite end faces of the stator core parts 4a and 4b located further away from each other, i.e., facing the end faces located on the outer sides, in which the outflow ports of the through holes 200a and 200b are formed. The cooling medium discharge pipes 411 and 412 are respectively connected to the circular pipes 414 and 415. A plurality of connecting pipes 417 are provided to the circular pipe 414, and these connecting pipes 417 are each connected to the outflow ports of through holes 200a. Likewise, the connecting pipes 418 provided to the circular pipe 415 are each connected to the outflow ports of through holes 200b.

The cooling medium fed from the pipe 410 into the circular pipe 413 further flows into the through holes 200a and 200b of the stator core parts 4a and 4b via the respective connecting pipes 416. Since the outflow ports of the through holes 200a and 200b are positioned lower than the inflow ports, the cooling medium is allowed to flow smoothly toward the outflow ports due to the difference in the potential energy level. The cooling medium flowing out from the through holes 200a and 200b then flows into circular pipes 414 and 415 and is returned to the cooling medium supply source via the pipes 411 and 412.

As described above, the stator core 4 in the embodiment is divided into two parts, the stator core parts 4a and 4b, and the cooling medium is supplied to each of these two stator core parts, which makes the axial length of each stator core parts shorter, and therefore enables the cooling medium to flow easily. This, in turn, makes it possible to cool also a large rotating electrical machine effectively. It is to be noted that instead of splitting the stator core 4 into two parts, it may be split into three or more parts.

While the pipes 414 and 415 are disposed on the end faces of the stator core 4, as shown in FIG. 20, so as to return the cooling medium flowing out of the cooling medium paths to the cooling medium supply source in the piping structure achieved in the embodiment as described above, these pipes may be omitted and the cooling medium may be discharged into the casing 9, and the discharged cooling medium may be returned from the casing 9 to the cooling medium supply source via a pipe. In such a case, the front ends of the pipes 416 do not need to be in tight contact with the end faces of the stator core 4, and instead, the cooling medium through the pipes 416 may be poured onto the end face of the stator core. Such a piping structure will allow a shorter length of the stator 2 as a whole in the axial direction, leading to a reduction of the axial dimension of the rotating electrical machine.

While an explanation is given above on applications in which the present invention is used for cooling a heated stator windings when they are supplied with electrical power, a similar cooling effects will be achieved for heating due to core loss or mechanical loss occurring as the motor is in operation.

While an explanation is given above on an example in which the present invention is applied to an inner-rotor type rotating electrical machine, the present invention is not limited to this example and it may be applied to an outer-rotor type rotating electrical machine to achieve similar advantages. For the stator core windings, the concentrated windings or the distributed windings may be used. Furthermore, while the rotating electrical machines achieved in the embodiments described above all include a rotor with permanent magnets embedded therein, the present invention may be applied to an induction-type motor equipped with a rotor that includes a rotor core and a squirrel-cage type windings constituted with an electrically conductive material, and also to a rotating electrical machine with a radial gap formed therein, such as a synchronous reluctance motor equipped with a rotor that includes a rotor core and a plurality of flux barriers.

The embodiments described above may be used individually or in any combination, since these embodiments may each independently be effected or may be synergistically effected when used in any combination. In addition, as long as the aspects characterizing the present invention are not impaired, the present invention is in not limited to the embodiments described above.

What is claimed is:

1. A rotating electrical machine, comprising:
a stator that includes a cylindrical stator core and a stator winding wire wound around the stator core;
a rotor disposed facing the stator via a gap; and
a plurality of cooling medium paths, each having an inflow port through which a cooling medium flows in and an outflow port through which a cooling medium flows out, the cooling medium paths being provided in the stator, extending in a direction of a central axis of the stator core; wherein each of the cooling medium paths is inclined relative to the central axis of the stator core, the cooling medium paths include at least one first cooling medium path and at least one second cooling medium path that flow the cooling medium in opposite directions to each other, the stator core is provided at one side thereof in the axial direction with the or each inflow port of one of the at least one first cooling medium path and the at least one second cooling medium path and with the or each outflow port of the other of the at least one first cooling medium path and the at least one second cooling medium path, and the or each inflow port provided at the one side of the stator core in the axial direction are disposed on a position higher in a vertical direction than the or each outflow port corresponding thereto provided at the other side of the stator core in the axial direction.

2. A rotating electrical machine according to claim 1, wherein:

each of the cooling medium paths is a groove formed on a wall surface of a slot in the stator core, extending from one end face of the stator core to another end face of the stator core.

3. A rotating electrical machine according to claim 1, wherein:

each of the cooling medium paths is a through hole formed in the stator core, going through the stator core from one end face of the stator core to another end face of the stator core.

4. A rotating electrical machine according to claim 1, wherein:

each of the cooling medium paths is a groove formed on an outer circumferential surface of the stator core, extending from one end face of the stator core to another end face of the stator core.

5. A rotating electrical machine according to claim 1, wherein:

each of the cooling medium paths is a through hole formed in an insulating material filling a slot that houses the stator winding, going through the stator core from one end face of the stator core to another end face of the stator core.

6. A rotating electrical machine according to claim 2, wherein:

the slot and a tooth formed in the stator core both assume a skewed structure whereby the slot and the tooth are twisted from the one end face of the stator core toward the other end face of the stator core so as to rotate around the central axis of the stator core.

7. A rotating electrical machine according to claim 1, wherein:

a slot and a tooth formed in the stator core both assume a skewed structure whereby the slot and the tooth are twisted from the one end face of the stator core toward the other end face of the stator core so as to rotate around the central axis of the stator core; and each of the cooling medium paths is a groove formed on a circumferential surface of the stator winding wire housed in the slot so as to extend along a direction in which the winding wire extends.

8. A rotating electrical machine according to claim 7, wherein:

the stator winding wire is a rectangular wire with a rectangular cross-section.

9. A rotating electrical machine according to claim 1, wherein:

the stator core is made up with a plurality of split core parts disposed along the central axis of the stator core; and the inflow port to which the cooling medium flows in is formed on an end face of a split core part facing a next split core.

10. A rotating electrical machine according to claim 1, further comprising:

a semi-circular pipe to which is connected the or each inflow port of one of the at least one first cooling medium path and the at least one second cooling medium path and a semi-circular pipe to which is connected the or each outflow port of the other of the at least one first cooling medium path and the at least one second cooling medium path.

* * * * *